US011897529B2

United States Patent
Zor et al.

(10) Patent No.: US 11,897,529 B2
(45) Date of Patent: Feb. 13, 2024

(54) AUTOMATIC HAND-DRIVEN WHEELED CART WITH BUILT-IN MOTOR IN THE WHEEL WITH BUTTON CONTROL ON HANDLE

(71) Applicants: Nir Zor, Givatayim (IL); Sapir Zor, Givatayim (IL)

(72) Inventors: Nir Zor, Givatayim (IL); Sapir Zor, Givatayim (IL)

( * ) Notice: Subject to any disclaimer, the term of this patent is extended or adjusted under 35 U.S.C. 154(b) by 0 days.

(21) Appl. No.: 18/128,345

(22) Filed: Mar. 30, 2023

(65) Prior Publication Data

US 2023/0234627 A1 Jul. 27, 2023

Related U.S. Application Data

(63) Continuation of application No. PCT/IB2022/057932, filed on Aug. 24, 2022.

(60) Provisional application No. 63/236,242, filed on Aug. 24, 2021.

(51) Int. Cl.
*B62B 1/16* (2006.01)
*B62B 5/00* (2006.01)

(52) U.S. Cl.
CPC .............. *B62B 1/16* (2013.01); *B62B 5/004* (2013.01); *B62B 5/0043* (2013.01); *B62B 5/0053* (2013.01); *B62B 5/0076* (2013.01)

(58) Field of Classification Search
CPC ......... B62B 1/16; B62B 5/004; B62B 5/0043; B62B 5/053; B62B 5/0076
See application file for complete search history.

(56) References Cited

U.S. PATENT DOCUMENTS

| | | | | |
|---|---|---|---|---|
| 8,869,922 B1* | 10/2014 | Isola | ....................... | B62B 5/003 |
| | | | | 180/19.1 |
| 10,103,566 B2* | 10/2018 | Curescu | .................. | A45C 15/00 |
| 11,433,934 B2* | 9/2022 | Butler | ..................... | B62B 3/005 |
| 2015/0326044 A1* | 11/2015 | Ashley | .................. | H02J 7/0042 |
| | | | | 320/103 |
| 2017/0088157 A1* | 3/2017 | Young | ................... | B62B 5/0036 |

* cited by examiner

Primary Examiner — Tony H Winner
(74) Attorney, Agent, or Firm — Mark M. Friedman

(57) ABSTRACT

A hand-driven wheeled cart or suitcase, including: a body section of the cart or suitcase including a back side, a top side, a bottom side and a front side; a handle coupled to the body section; two wheels coupled to the bottom side of the body section, adjacent the back side of the body section; and a motor housed in one of the two wheels, the motor being actuated by a button on the handle.

18 Claims, 3 Drawing Sheets

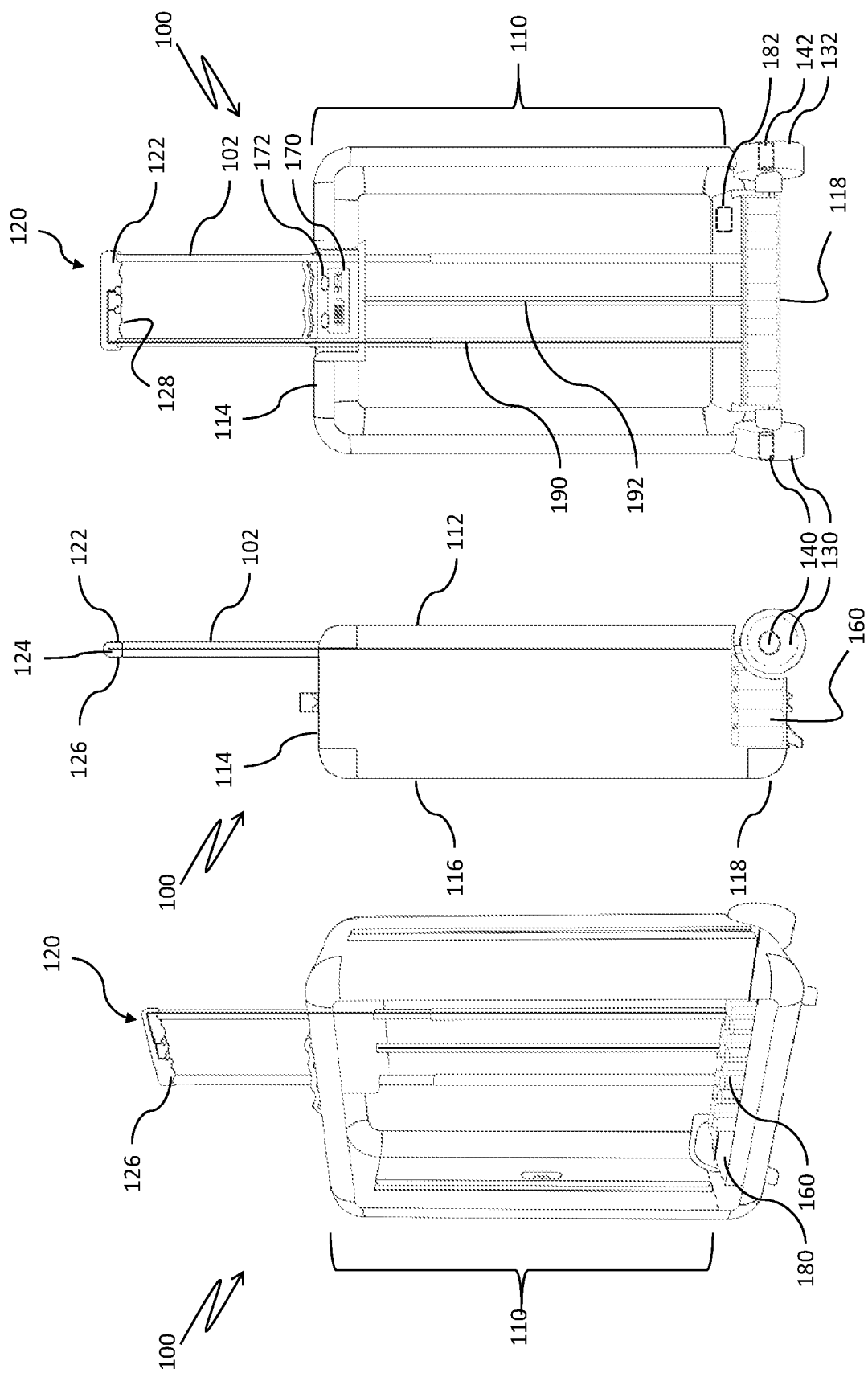

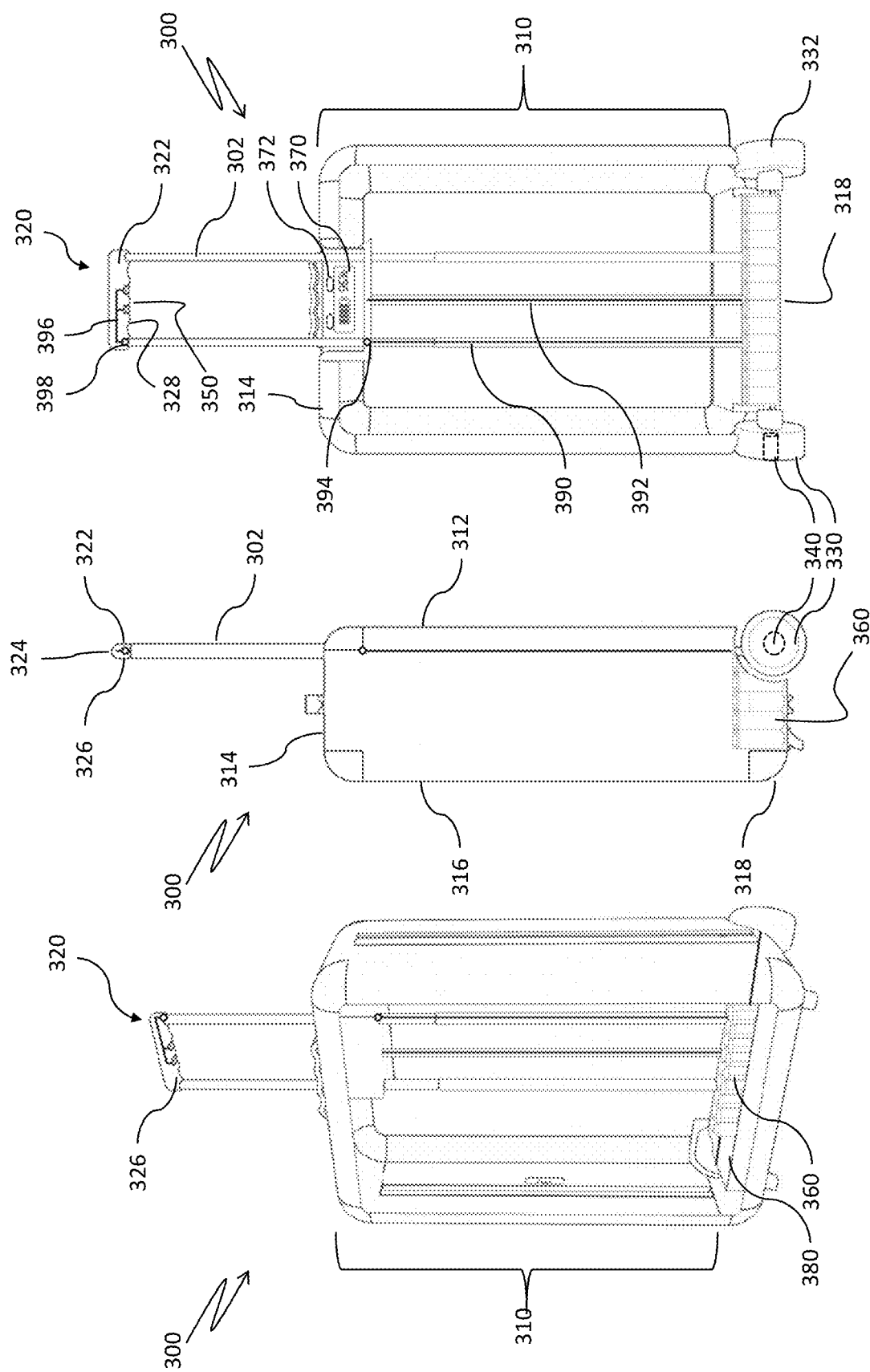

AUTOMATIC HAND-DRIVEN WHEELED CART WITH BUILT-IN MOTOR IN THE WHEEL WITH BUTTON CONTROL ON HANDLE

FIELD OF THE INVENTION

The present invention relates to motorized, hand-driven vehicles and, more particularly, to a suitcase, cart, trolley etc. that has motorized wheels with one or more built-it motors in the wheels and with push or touch button control in the top, bottom, or sides of the handle.

BACKGROUND OF THE INVENTION

Most motorized carts and suitcases have transmission engines with belts and gears. Gears and wheels need to be oiled. If the engine breaks, that is something that neither a 6-year-old nor a 90-year-old, nor anyone in-between that is not a trained professional can take care of. If they try, it is both time consuming and dangerous for someone who does not know what they are doing. Furthermore, the belt needs to be oiled and can tear and cause other damage. There is also constant need for maintenance.

The common hand-driven vehicles/load-movers run on DC motors that are external motors. These motors can overheat and explode. They are very noisy and unsafe. Many individuals have been burned by hot motors. They are also very cumbersome.

There are various carts and suitcases the are controlled wirelessly, semi-autonomously or autonomously with motion sensors and/or joysticks. Regarding wireless suitcases that follow the person, these wireless suitcases can damage a person nearby, as well as other objects in their vicinity. They are also very cumbersome. Also, the touch sensors are problematic and break very quickly and the contacts often get damaged. When the touch system breaks down, a professional repair job is needed which is undesirable, as the cost of the repair is very high and includes a lot of hassle for the user. These complex systems are often very complicated with many buttons/instructions, as well as having a cumbersome and uncomfortable user experience. There are often malfunctions with the sensors.

There are suitcases and carts that are moved by a joystick. These systems and their user interface are very cumbersome, do not provide a pleasant user experience and experience a lot of glitches. Repairs need to be performed by specialized professionals if and when the systems break down. Also, when these systems malfunction, in many cases, the user cannot move the cart or suitcase at all.

SUMMARY OF THE INVENTION

According to the present invention there is provided a hand-driven wheeled cart or suitcase, including: a body section of the cart or suitcase including a back side, a top side, a bottom side and a front side; a handle coupled to the the body section; two wheels coupled to the bottom side of the body section, adjacent the back side of the body section; and a motor housed in one of the two wheels, the motor being actuated by a button on the handle.

According to further features in preferred embodiments of the invention the button is coupled to the motor in a wired or wireless manner.

According to still further features in the described preferred embodiments the button is disposed on a top surface of the handle, the top surface being the surface farthest from the body section.

According to further features the button is disposed on a bottom surface of the handle, the bottom surface being closest to the body section. According to further features the button is disposed on a back surface of the handle, the back surface being closest to the back side of the body section. According to further features the button is disposed on a front surface of the handle, the front surface being closest to the front side of the body section.

According to further features the cart or suitcase further includes an additional motor disposed inside a second of the two wheels. According to further features the cart or suitcase further includes a rechargeable battery for powering the motor.

According to further features the cart or suitcase further includes a display disposed on one of: the top or back side of the body section and the handle, the display configured to indicate a remaining battery life of the battery. According to further features the rechargeable battery is a reversibly removable or detachable battery pack adapted to charge various portable electronic devices. According to further features the battery pack includes an audio indicator for indicating a status of the removeable battery pack.

According to further features the cart or suitcase further includes a USB port for charging mobile devices. According to further features the cart or suitcase further includes a wireless charger for wirelessly charging mobile devices.

According to further features the button is an electromechanical push-button or a touch-sensitive button.

According to further features the touch-sensitive button is wireless and the cart or suitcase further comprises a battery configured to wirelessly charge the wireless, touch-sensitive button.

According to further features the cart or suitcase further includes a controller for controlling the motor. According to further features the cart or suitcase further includes an additional controller for controlling a second motor in a second of the two wheels. According to further features the cart or suitcase further includes a second motor in a second of the two wheels, wherein the controller is a dual controller for controlling both motors.

BRIEF DESCRIPTION OF THE DRAWINGS

Various embodiments are herein described, by way of example only, with reference to the accompanying drawings, wherein:

FIGS. 1A, 1B and 1C are a front perspective view, a profile view, and a back view of an exemplary hand-driven suitcase 100 according to the present invention;

FIG. 3A, 3B, and 3C are a front perspective view, a profile view, and a back view of an exemplary hand-driven suitcase 100 according to the present invention.

DESCRIPTION OF THE PREFERRED EMBODIMENTS

Figure 2C:
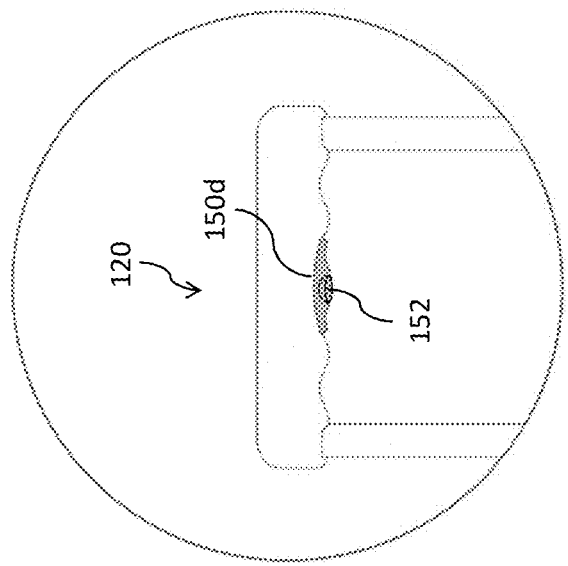
FIGS. 2A, 2B and 2C are example configurations of the button (or buttons) 150 on the handle 120.

The principles and operation of a hand-driven cart or suitcase with one or more motorized wheels according to the present invention may be better understood with reference to the drawings and the accompanying description.

There is disclosed a hand-driven, wheeled cart, suitcase, trolley, dolly, freight cart etc. that is motor-powered and actuated by a button (e.g., a push button or touch-sensitive button) disposed on a handle (on the top, bottom or sides of the handle). The button augments and/or automates pushing and/or pulling the cart etc. with easy effort and a light touch on (or depression of) the button, such that even a child (e.g., 6 years old or less) and an elderly person (e.g., 90 years old or more) is able to push or pull the cart etc. without effort, even when carrying a heavy load (such as about 80 kgs).

The terms cart or suitcase are used representatively herein but are intended to refer equally, mutatis mutandis, to each of the aforementioned wheeled vehicles as well as any other hand-driven vehicles that fit the description. The cart or suitcase (etc.) includes at least one motorized wheel which is activated/actuated by a button in the handle of cart or suitcase.

FIGS. 1A, 1B and 1C respectively illustrate a front perspective view, a profile view, and a back view of an exemplary hand-driven suitcase 100 according to the present invention. The front perspective and back views have the front and back panels of the suitcase removed (made invisible) in order to view the internal components of the suitcase. The profile view shows the battery pack in fantom lines.

Referring to the suitcase 100 in each of the views, it is made clear that the illustrated embodiment (as well as other embodiments detailed herein) is merely exemplary and not intended to be limiting in any way.

The cart or suitcase includes a body section that has at least back, top, bottom, and front sides. For example, suitcase 100 includes a body section 110 which is adapted to house or hold the goods being transported. The body section includes a back side 112, a top side 114, a front side 116 and a bottom side 118.

The cart or suitcase includes a handle coupled to the top of the body section of the cart of suitcase. For example, suitcase 100 includes a handle 120 that is coupled to the top side 114 of the body section 110. The handle may be of any configuration that functionally serves to direct the cart or suitcase. In the exemplary embodiment depicted in the Figures, the handle 120 is disposed on extendible rods 102 that can be extended and retracted as needed. In use, the suitcase is tilted onto the [back] wheels and pulled behind the user. The handle of the cart or suitcase may be configured to pull or push (or otherwise direct) the cart or suitcase. The handle of the cart or suitcase has top, bottom, front, and back surfaces. For example, handle 120 has a back surface 122, a top surface 124, a front surface 126 and a bottom surface 128.

The cart or suitcase has at least two wheels. The two wheels are coupled to the bottom side of the body section, adjacent the back side of the body section. For example, suitcase 100 includes two wheels 130 and 132 are coupled to the bottom side 118 of the body section 110, adjacent the back side 112 of the body section 118. In other embodiments, the cart or suitcase may have more than two wheels. For example, the cart or suitcase may have four wheels. A trolley may even have six or more wheels. In any of the aforementioned embodiments, at least one wheel is motorized as detailed hereafter.

The cart or suitcase according to the present invention further includes a motor (also referred to herein as an engine) housed in one of the two wheels. For example, suitcase 100 includes one wheel 130 in which a motor 140 is housed. Any type of relevant motor adapted to be housed within a wheel is to be considered within the scope of the invention. In some cases, a single motor can propel the cart or suitcase (e.g., suitcase 100) at a speed of up to approximately 10-15 kph for a distance of approximately 20 km while carrying the load of an average person, between 80-100 kg. Young children and the elderly can easily pull or push the cart or suitcase without significant effort.

The built-in motor/engine is hermetically sealed and hidden. The motor has no transmission, belt and/or gears. There are no gears that need lubrication or belts that need to be replaced when torn. The motor is built into the wheel and is very safe. There is no maintenance required. A non-functioning wheel is easily replaced. The estimated time to change a wheel with a built-in motor is about 5 minutes. There is no danger of getting burned from the built-in engine and the motor is much quieter than an external DC motor.

In some example embodiments, another (i.e., a second) motor disposed inside a second of the two wheels. It may be preferable to have two built-in wheel-drives. However, the motors are sufficiently strong that if one of the motors fails, the other motor can still drive the cart/suitcase/trolley, dolly, freight cart etc.

The motor is actuated/controlled by a button on the handle. For example, motor 140 is controlled (activated/actuated/deactivated/advancing in a first direction, advancing in a second direction opposite the first direction, etc.) by a button 150 (see FIGS. 2A-C). The button is disposed on handle 120.

Figure 2B:
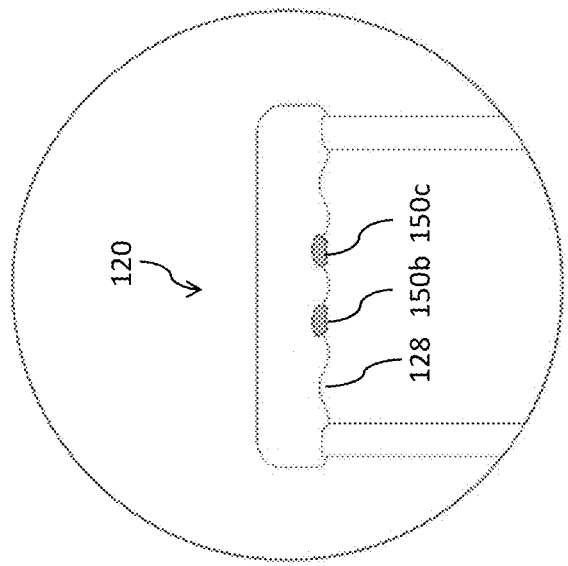
Figure 2A:
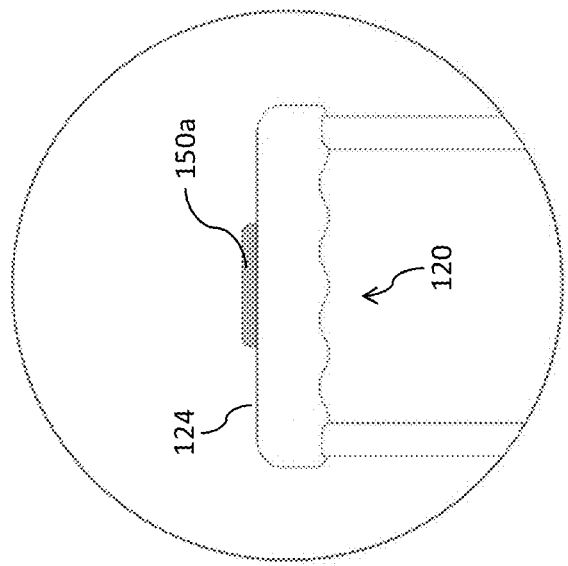

FIGS. 2A, 2B and 2C each depict an example configuration of the button (or buttons) 150 on the handle 120. In FIG. 2A the button 150a is located on the top surface 124 of handle 120. The top surface 124 being the surface of the handle 120 that is farthest from the body section 110 of the suitcase 100 (or disposed on a plane corresponding to the plane of the top side of the body section). This button 150a may be depressed (or otherwise actuated) by the palm of the user's hand when the user is holding or gripping the handle.

In FIG. 2B, the button 150b is located on the bottom surface 128 of handle 120. The bottom surface 128 being the surface of the handle 120 that is closest to the body section 110 of the suitcase 100 (or disposed on a plane corresponding to the plane of the bottom side of the body section). The button 150b on the bottom surface of the handle may be actuated or activated by one or more fingers of the user's hand when gripping the handle.

According to some embodiments, a second button may be found the handle of the cart or suitcase. In FIG. 2B, an example configuration is depicted including a second button 150c is disposed next to the first button 150b. In such cases, the first button 150b may be adapted to propel the wheel in a first direction while the second button 150c may be adapted to propel the wheel in a second direction, wherein the first direction (e.g., the wheel rotates in a clockwise direction) is opposite the second direction (e.g., the wheel rotates in a counter-clockwise direction).

According to some embodiments, only one button is located on the bottom surface of the handle of the cart or suitcase. In FIG. 2C, an example configuration of a single button 150d is depicted. The button may be adapted to drive the motor in a specific direction (e.g., backwards). In another embodiment, the button may be adapted to drive the motor in a direction in which the suitcase or cart is being driven by the user. For example, in the embodiment of a suitcase with only two back wheels, the user tilts the suitcase back onto the wheels and pulls the suitcase backwards behind them. According to the instant embodiment, pushing the button 150d augments the user's efforts and drives the motor in the direction the user is pulling it. If the user decides to now push the suitcase forwards, the motor will reverse direction and augment the user's efforts by driving the suitcase forwards. (The directions forwards and backwards are used herein in a relative manner, relative to the front or back of the suitcase.)

In some embodiments, the button 150*d* may further include a rotatable switch or roller 152 (shown in phantom lines to indicate that this is an optional feature). The roller or switch being adapted to indicate the direction of travel. The section of whichever finger is on the roller/button can pull the button to the handle and also roll the roller or move the switch in the desired direction.

According to another configuration (not shown), the button is disposed on a back surface of the handle, the back surface being the surface of the handle closest to (or resting on a plane corresponding to the plane of) the back side of the body section. Such a button could be actuated by the thumb of a user, when gripping the handle. According to yet another configuration (not shown), the button is disposed on a front surface of the handle, the front surface being the surface of the handle closest to (or resting on a plane corresponding to the plane of) the front side of the body section. Such a button could be actuated by the finger (e.g., pressing down the proximal and/or intermediate phalanges) of a user, when gripping the handle.

In some embodiments, the button (or buttons) is a press/push button, i.e., an electro-mechanical button that can be physically pressed (squeezed, pushed, depressed). In other embodiments, the button (or buttons) is a touch-sensitive button. In embodiments, depressing or actuating the button pulls (or pushes) the cart or suitcase diagonally or in any other angle. It is sufficient to lightly depress the button. Such a configuration and functionality provide a much better user experience. Further, the cart or suitcase is pulled/pushed gently enough for a young child or elderly person to handle. The user can easily pull or push the suitcase, without a cumbersome interface and providing an excellent user experience.

The cart or suitcase further includes a rechargeable battery for powering the motor. For example, suitcase 100 depicted in FIGS. 1A-1C includes a rechargeable battery 160 for powering the motor 140. In example embodiments, such as shown in FIGS. 1A-1C, the battery 160 is housed proximate to the wheels 130, 132.

One example of a rechargeable battery is a 36V/4000 AH battery capable of sustaining a speed 10-15 km/h for a distance of 20 km (which is a great deal of suitcase or cart travel) and able to charge a smartphone 3 times over (see below). As such, it is not necessary to charge the battery every day. In fact, the battery can probably survive the lifespan of hand-driven, load bearing vehicle, be it a suitcase, cart, trolley or the like.

In some embodiments, the rechargeable battery 160 is a reversibly removable or detachable battery pack that is further adapted to charge various portable electronic devices, even when detached from the cart or suitcase.

In some embodiments, the cart or suitcase includes a display (e.g., a digital screen) that shows, at least, how much battery power is left. For example, suitcase 100 further includes a digital display screen 170 disposed on the back side of the body section. In other example configurations (not shown), the display is positioned at one of: the top side of the body section and the handle. The display configured to indicate, inter alia, a remaining battery life of the battery. Such a display has an added value of providing confidence that the battery will last the journey aside from providing the practical indication whether the battery needs to be charged.

In some embodiments where the battery pack is reversibly detachable and usable in the detached state, the battery pack includes a display configured to indicate at least one of: a remaining battery life of the battery pack and an amount of battery charged afforded to the various portable electronic devices that are drawing a charge from the battery.

In some embodiments, the battery pack includes an audio component for indicating a status of the removeable battery pack. In some embodiments, the cart or suitcase includes one or more USB ports for charging mobile devices. In some embodiments, the cart or suitcase includes a wireless charger for wirelessly charging portable devices. In some embodiments, the battery is configured to wirelessly charge a wireless, touch-sensitive button (e.g., button 150).

The cart or suitcase further includes a controller for controlling, at least the motor, as well as all other electronic functions, such as, the display. For example, suitcase 100 includes at least one controller 180 for controlling the motorized wheel. In the case of two motorized wheels, a single controller (e.g., a dual motor controller) 180 can control both motors. In other embodiments, a second controller 182 is employed for controlling, at least, a second motor 142 in a second wheel of the at least two wheels of the cart or suitcase.

The cart or suitcase includes wiring that connects between the various components, including between the button(s) in the handle and the motor in the wheel. For example, suitcase 100 includes wiring 190 electrically coupling the motor(s) in the wheel(s) to the button(s) in the handle and to the battery 160. Additional wiring 192 couples the battery 160 to the display 170. Optionally, there are provided charging ports (e.g., USB ports) 172 proximate the display (or in another easily accessible location) for charging portable devices. The charging ports also derive their power from battery 160.

Another possible configuration is shown in FIGS. 3A, 3B, and 3C which respectively illustrate a front perspective view, a profile view, and a back view of an exemplary hand-driven suitcase 300 according to an embodiment of the present invention.. FIGS. 3A-3C depict an example configuration of a suitcase 300 that is similar to suitcase 100 in every way except for the fact that a motor 340, which is housed in a wheel 330 disposed on a bottom side of a body section 310 is in wireless communication (as opposed to being either in wired or wireless communication) with a button 350 in a handle 320 which is charged only when the handle is in the retracted position. Therefore, all the details mentioned above regarding suitcase 100 should be seen as if repeated in full herein, mutatis mutandis, with the first numeral of the reference number of each component being a "3" instead of a "1". The configurations of button or buttons depicted in FIGS. 2A-2C apply equally to the embodiment of suitcase 300, and handle 320, mutatis mutandis.

Suitcase 300 differs from suitcase 100 in that the button(s) or actuator(s) 350 is charged in a wired manner but operates (i.e., actuates the motor etc.) wirelessly. Wiring 390 extends from the battery (and is also coupled to the controller and motor) and terminates at a magnetic contact (battery side) 394. Wiring 396 in the handle begins at a magnetic contact 398 and terminates at the button or buttons 350. The handle is shown in the extended position where the handle wiring 396 is disconnected from wiring 390 in the body. When the handle is in the non-extended/retracted position, the magnetic contact (handle side) 398 magnetically couples with contact 394 and draws power for the charging the button from batter 360.

All the configurations discussed above with regards to FIGS. 2A-2C should be seen is recited fully herein and the wiring shown here in the handle should be understood as merely one example, e.g., applicable to the configuration of FIG. 2B, and that other wiring would be used for other configurations.

For the sake of completeness, a list of references is provided:

- 300—suitcase
- 302—extensible rod
- 310—body section of suitcase
- 312—back side of body section
- 314—top side of body section
- 316—front side of body section
- 318—bottom side of body section
- 320—handle
- 322—back surface of handle
- 324—top surface of handle
- 326—front surface of handle
- 328—bottom surface of handle
- 330—wheel
- 323—second wheel
- 340—motor
- 350—button
- 360—battery
- 370—display
- 372—charging ports
- 380—controller(s)
- 390—wiring
- 392—additional wiring
- 394—magnetic contact (battery side)
- 396—handle wiring
- 398—magnetic contact (handle side)

Additional Features/Variations

Speed of movement is set to the average speed of walking. Speed is adaptive to the speed of movement of the user. The speed is also affected by the weight of the load in the cart or suitcase.

Alternatively, or additionally, there can be preset speeds that the user can select a speed from and/or an interface via which the user sets the speed manually (e.g., turning a dial or inputting a number via an electronic interface).

Different types of handles: push handle, pull handle, telescopic, folding etc.

Different sizes of wheels, motors, batteries.

Automatic shut-off when not used for a predetermined amount of time.

Releasing the button stops the motor from running In some embodiments, there is an auto-brake feature that activates when the button is released such that releasing the button stops the cart or suitcase from moving, even braking against inertia.

Each of the components is adapted for quick disassembly and/or replacement. These components include at least the battery and the motorized wheel. The disassemble and replacement can both be performed without professional knowledge in the field of electronic and/or electro-mechanics.

The system can be bought separately to the suitcase or cart and then retrofitted to the existing cart or suitcase.

The system can be scaled to any size or shape of the suitcase or cart either during manufacture or as a retrofitting set.

The mechanical parts (motor, battery, wires etc.) are insulated and well protected.

Many elderly (as well as others who walk or take public transport to shop at grocery stores) use personal shopping carts to transport their groceries from the store to home. When laden with groceries, these carts can be difficult to move around with and/or to maneuver and/or to drag up hills, especially steep hills. One especially difficult activity is hauling the cart up the stairs. The instant system is especially helpful for the elderly (as well as everyone else) and eases the activity of bumping the cart up stairs as the strong motor does most of the work. The system can even be implemented in baby strollers for all of the reasons mentioned herein.

One very good type of shopping cart (or tool cart for workmen lots of heavy tools to lug around or for dollies used for moving heavy objects and/or deliveries, such as grocery deliveries) has three wheels on each side (in a triangular formation) which helps to go up and down stairs. The motor of the instant system makes climbing stairs (as well as hauling and maneuvering the load) even easier and solves the cause of back and wrist/arm pains from dragging and pulling heavily laden carts.

The present system brings carts and suitcases into the $21^{st}$ century in the same way that motorized hydraulic lifts changed the ability of the workers to move and position heavy loads without expending energy and manpower.

The present system serves as a very good solution for uneven surfaces (dirt roads, uneven pavement and sidewalks) such as are often found when on vacation with heavy luggage and poor road/sidewalk/path infrastructure.

Medical Considerations

Rolled carts and cases (including children's school cases, for example) are recognized by the medical community as one of the major causes of orthopedic problems in children and adults. Heavy loads in carts and cases exert asymmetrical weight on the body which is likely to cause back and muscle problem over time. Carts and cases which are driven (e.g., dragged behind the user) one-handed results in the burden and exerted effort being unevenly distributed throughout the body. This is often also repetitive, as most people use the same hand to pull or push a trolley, cart or suitcase. The repetitive, uneven activity causes much of the aforementioned issues.

The present system, with motorized wheel(s) that are activated by a [light] touch resulting in effortless control of even a laden cart or suitcase, was checked by medical experts and deemed to solve the aforementioned issues by lessening the strain and burden on the body considerably, such that the negative consequences of uneven distribution of weight and repetitive activities are mitigated.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A hand-driven wheeled cart or suitcase, comprising:
a body section of the cart or suitcase including a back side, a top side, a bottom side and a front side;
a handle coupled to the body section;
two wheels coupled to the bottom side of the body section, adjacent the back side of the body section; and
a motor housed in one of the two wheels, the motor being actuated by a button on the handle, releasing the button stops the motor from running.

2. The cart or suitcase of claim 1, wherein the button is coupled to the motor in a wired manner.

3. The cart or suitcase of claim 1, wherein the button is coupled to the motor in a wireless manner.

4. The cart or suitcase of claim 1, wherein the button is disposed on a top surface of the handle, the top surface being the surface farthest from the body section.

5. The cart or suitcase of claim 1, wherein the button is disposed on a bottom surface of the handle, the bottom surface being closest to the body section.

6. The cart or suitcase of claim 1, wherein the button is disposed on a back surface of the handle, the back surface being closest to the back side of the body section.

7. The cart or suitcase of claim 1, wherein the button is disposed on a front surface of the handle, the front surface being closest to the front side of the body section.

8. The cart or suitcase of claim 1, further comprising:
an additional motor disposed inside a second of the two wheels.

9. The cart or suitcase of claim 1, further comprising a rechargeable battery for powering the motor.

10. The cart or suitcase of claim 9, further comprising a display disposed on one of: the top or back side of the body section and the handle, the display configured to indicate a remaining battery life of the battery.

11. The cart or suitcase of claim 9, wherein the rechargeable battery is a reversibly removable or detachable battery pack adapted to charge various portable electronic devices.

12. The cart or suitcase of claim 11, wherein the battery pack includes a display configured to indicate at least one of: a remaining battery life of the battery pack and an amount of battery charged afforded to the various portable electronic devices.

13. The cart or suitcase of claim 11, wherein the battery pack includes an audio component for indicating a status of the removeable battery pack.

14. The cart or suitcase of claim 1, further comprising a USB port for charging mobile devices.

15. The cart or suitcase of claim 1, wherein the button is an electro-mechanical push-button or a touch-sensitive button.

16. The cart or suitcase of claim 1, further comprising a controller for controlling the motor.

17. The cart or suitcase of claim 16, further comprising an additional controller for controlling a second motor in a second of the two wheels.

18. The cart or suitcase of claim 16, further comprising a second motor in a second of the two wheels, wherein the controller is a dual motor controller for controlling both motors.

\* \* \* \* \*